United States Patent Office 3,302,495
Patented Feb. 7, 1967

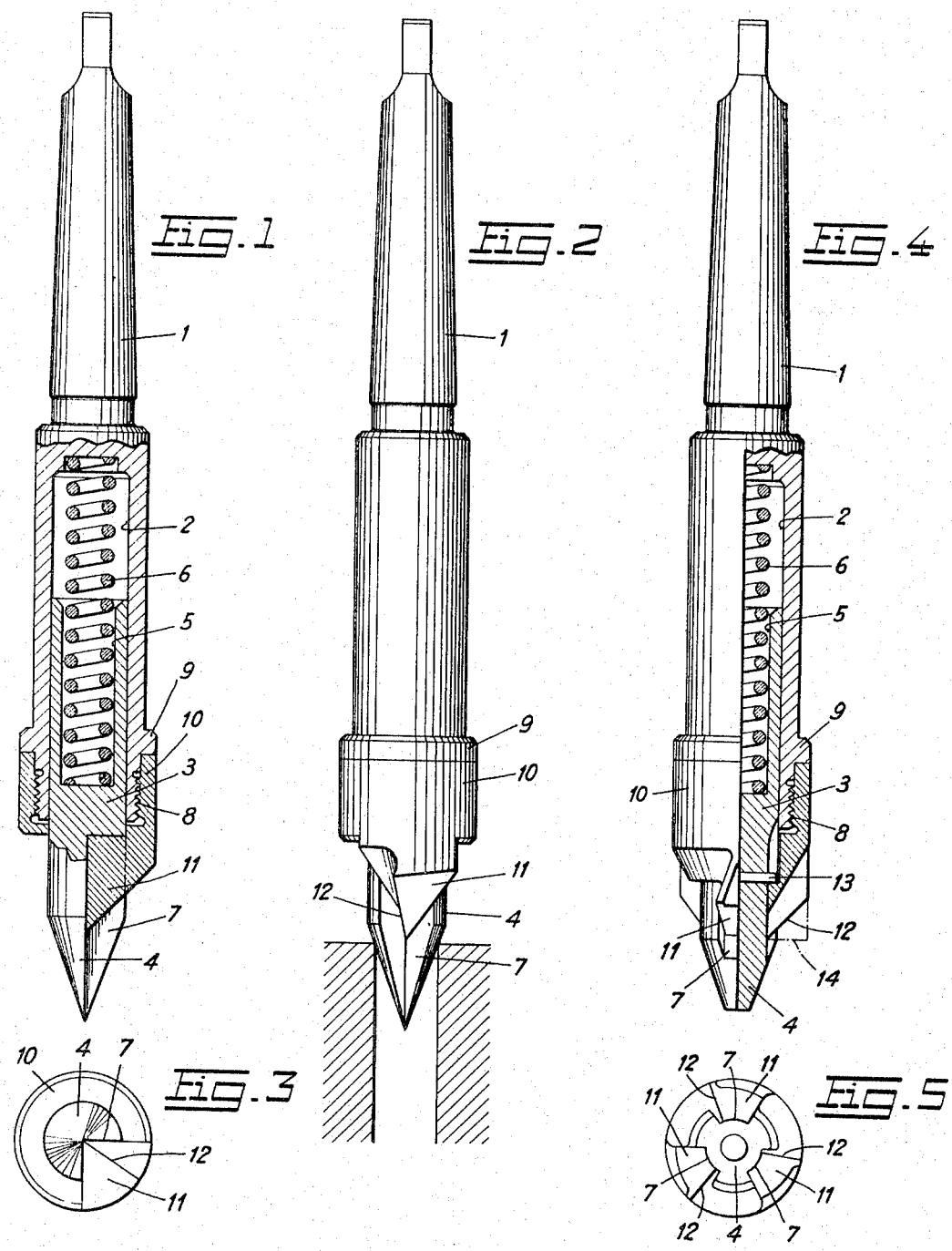

3,302,495
COUNTERSINK
Edgar Schmid, Mulhestrasse 485,
Gerlafingen, Switzerland
Filed July 30, 1964, Ser. No. 386,260
Claims priority, application Switzerland, Aug. 6, 1963,
9,710/63
5 Claims. (Cl. 77—73.5)

This invention relates to a countersink which includes a pin for centering the cutting element or elements with respect to the hole to be countersunk, the pin being axially slidable in a central bore in the tool shaft and normally urged outwardly by a spring.

Countersinks have previously been proposed which provide guidance for the cutting element or elements with respect to the workpiece but countersinks of this general type heretofore known have been of a complicated construction involving two or three individually movable centering pins.

The countersink of the present invention comprises fewer elements which are of simple form and accordingly produced at lower cost. Furthermore, the construction of the present invention is such as to provide much greater rigidity in the tool and more accurate centering of the countersink cutting elements with respect to the hole to be countersunk.

The objects of the present invention are achieved, speaking generally, by providing a centering pin having along its periphery at least one generally axially extending, preferably sector-shaped, recess or groove in which a cutting edge lip is accurately and precisely guided in an axial direction. The cutting edge or edges of the cutting element or elements of the tool are ground to provide proper cutting and clearance angles and the centering pin arranged as contemplated herein does not interfere with efficient and effective countersinking.

With the countersink constructed as contemplated herein no burrs are formed at the juncture of the countersink with the bored hole, since the conical centering face of the guide pin applies a continuous smoothing pressure to this portion of the work. In the accompanying drawings two examples of countersinks constructed according to the present invention are shown, one having a single cutting element, and the other having three circumferentially spaced cutting elements.

In the drawing:

FIG. 1 is an elevational view partly in cross section of one form of the countersink of the present invention having a single cutting lip;

FIG. 2 is an elevational view at right angles to FIG. 1 taken from the right-hand side thereof;

FIG. 3 is a bottom end view of the structure of FIG. 1;

FIG. 4 is a view similar to FIG. 1 but showing a three-lip countersink; and

FIG. 5 is a bottom end view of the structure of FIG. 4.

The main body element of the countersink shown in FIGS. 1 through 3 includes the usual tapered shank 1 for fitting the tool into a chuck and is bored at its other end as indicated at 2 to slidably receive a guide pin 3 which is axially bored as at 5 at its inner end and has a tapered centering tip 4 at its outer end. A compression coil spring 6 is received in bore 2 of the tool body and bore 5 of centering pin 3.

A sector-shaped recess or groove 7 extends from the tapered end of pin 3 partway along its periphery in an axial direction. A combined bit and guide pin retainer is designated 10 and is threaded onto the outer end of the main body of the countersink. The member 10 has a sector-shaped portion 11 which fits into the recess 7 of pin 3 and is provided with a countersinking cutting edge 12. Spring 6 normally urges guide pin 3 axially outwardly so that the inner end of its recess or groove 7 abuts the inner end of the sector-shaped portion 11 of member 10.

The modification shown in FIGS. 4 and 5 is generally the same as that of FIGS. 1 through 3 excepting that three sector-shaped portions 11 are uniformly spaced about member 10 and are axially movable in corresponding grooves 7 in guide pin 3. In this embodiment outward movement of pin 3 is limited by engagement of a stop pin 13 against the inner ends of the sector-shaped portions 11 of member 10.

In both embodiments the angle of the taper of the centering tip 4 of pin 3 is substantially smaller than the angle which the cutting edges make with the axis of the tool. Better guidance is anchieved with this more acute taper. The angle of the cutting edges 12 may vary as desired. In the dot and dash line showing at 14 in FIG. 4 the cutting edges extend at 90° to the axis of the tool, whereby the same comprises a counterbore rather than a countersink as in the principal embodiments. This angle may also exceed 90°.

In use, when the rotating tool is inserted into a bore hole, as shown in FIG. 2, the tapered centering tip 4 engages the edges of the bored hole to center the tool and further downward movement of the tool causes the guide pin 3 to recede into the bore 2 of the holder against the action of spring 6. Nevertheless, the spring holds the tapered tip 4 in guiding engagement with the edge of the bored hole to be countersunk. As countersinking proceeds the tapered tip 4 moves downwardly into the countersunk hole and due to its more acute taper, the surface 4 is always engaged against the juncture of the bored hole proper and the newly formed countersunk portion thereof. Burrs which may be caused by pressure of tapered tip 4 on the edge of the bored hole are continuously removed as countersinking proceeds.

The face and clearance angles of the cutting bit of the present invention are very simply ground and clean and effective countersinking is achieved. While the recesses 7 extend axially in the illustrated embodiments, such recesses might extend slightly helically if desired.

I claim:

1. A countersink comprising a holder having a longitudinal bore opening toward the working end thereof, a centering pin having a cylindrical portion slidable in and accurately guided by said bore, said centering pin having at its outer end a conical centering surface for engaging the rim of a bore in a workpiece and at least one longitudinal peripheral groove therein, a cutting member having an annular portion disposed about said centering pin and removably secured to the working end of said holder, at least one cutting part integral with the annular portion of said cutting member and extending axially outwardly therefrom, said cutting part extending radially inwardly into said groove of said centering pin and having an inclined cutting edge defining with the axis of the tool and angle equal to or greater than the corresponding angle of said conical centering pin surface, spring means acting between the bore in said holder and the centering pin to urge the latter outwardly toward the work and in engagement with the rim of a hole to be countersunk, and stop means on said centering pin and said member to limit outward axial movement of the centering pin under the action of said spring.

2. A countersink according to claim 1 wherein said centering pin has a plurality of longitudinal peripheral grooves therein and said cutting member has a corresponding number of cutting parts extending into said grooves.

3. A countersink according to claim 1 wherein said inclined cutting edge extends continuously both radially inwardly and radially outwardly with respect to the periphery of said cylindrical portion of said centering pin.

4. A countersink according to claim 1 wherein said groove is sector-shaped in transverse cross section.

5. A countersink according to claim 1 wherein the included angle of said conical centering surface is substantially less than the included angle of the cone defined by said inclined cutting edge upon rotation thereof.

References Cited by the Examiner
UNITED STATES PATENTS

| 2,187,221 | 1/1940 | Brown | 77—73 |
| 2,613,558 | 10/1952 | Swenson | 77—73.5 |

OTHER REFERENCES

Publication, American Machinist, page 628, dated October 12, 1916, "Counterbore With Dispapearing Pilot," by Jan Spaander.

FRANCIS S. HUSAR, *Primary Examiner.*